United States Patent
He et al.

(10) Patent No.: US 11,712,961 B2
(45) Date of Patent: Aug. 1, 2023

(54) DUAL-ROTOR IN-WHEEL MOTOR BASED ON AXIAL MAGNETIC FIELD AND CONTROL METHOD THEREOF

(71) Applicant: JIANGSU UNIVERSITY, Zhenjiang (CN)

(72) Inventors: Ren He, Zhenjiang (CN); Junmin Li, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 11 days.

(21) Appl. No.: 17/622,881

(22) PCT Filed: Mar. 16, 2021

(86) PCT No.: PCT/CN2021/081107
§ 371 (c)(1),
(2) Date: Dec. 27, 2021

(87) PCT Pub. No.: WO2022/160426
PCT Pub. Date: Aug. 4, 2022

(65) Prior Publication Data
US 2023/0121548 A1 Apr. 20, 2023

(30) Foreign Application Priority Data

Jan. 29, 2021 (CN) .......................... 202110123294.7

(51) Int. Cl.
*B60K 17/02* (2006.01)
*F16H 1/28* (2006.01)
(Continued)

(52) U.S. Cl.
CPC ............ *B60K 7/0007* (2013.01); *B60K 17/02* (2013.01); *B60K 17/046* (2013.01); *B60L 7/10* (2013.01);
(Continued)

(58) Field of Classification Search
CPC .... B60K 7/0007; B60K 17/02; B60K 17/046; B60K 2007/003; B60K 2007/0092;
(Continued)

(56) References Cited

U.S. PATENT DOCUMENTS

2009/0033166 A1* 2/2009 Takeuchi ................. H02K 7/14
318/400.41
2021/0094413 A1* 4/2021 Kim ...................... B60K 17/046
(Continued)

FOREIGN PATENT DOCUMENTS

CN 101951092 A 1/2011
CN 102158026 A 8/2011
(Continued)

OTHER PUBLICATIONS

Machine translation of CN 109606096 A (Year: 2019).*
Machine translation of CN CN 111845320 A (Year: 2020).*

*Primary Examiner* — Jacob S. Scott
*Assistant Examiner* — Farhana Pervin
(74) *Attorney, Agent, or Firm* — Bayramoglu Law Offices LLC (57) ABSTRACT

A dual-rotor in-wheel motor based on an axial magnetic field and a control method thereof are provided. The dual-rotor in-wheel motor includes an axle and a hub. The axle is fixedly connected to a frame. The hub relatively rotates around the axle. A disc-shaped intermediate stator is fixedly connected on the axle. A left coil assembly and a right coil assembly are fixedly mounted on two sides of the intermediate stator, respectively. A left rotor and a right rotor are respectively arranged on the two sides of the intermediate stator. The left coil assembly drives the left rotor to rotate, and the right coil assembly drives the right rotor to rotate. A left clutch is arranged between the left rotor and the hub, and
(Continued)

a right clutch and a speed reduction mechanism are arranged between the right rotor and the hub.

10 Claims, 6 Drawing Sheets (51) Int. Cl.
*B60K 7/00* (2006.01)
*B60K 17/04* (2006.01)
*B60L 7/10* (2006.01)
*H02K 7/00* (2006.01)
*H02K 7/108* (2006.01)
*H02K 7/116* (2006.01)
*H02K 21/24* (2006.01)
*H02P 3/14* (2006.01)
*F16H 57/08* (2006.01)

(52) U.S. Cl.
CPC ............... *F16H 1/28* (2013.01); *H02K 7/006* (2013.01); *H02K 7/108* (2013.01); *H02K 7/116* (2013.01); *H02K 21/24* (2013.01); *H02P 3/14* (2013.01); *B60K 2007/003* (2013.01); *B60K 2007/0092* (2013.01); *F16H 2057/087* (2013.01); *H02P 2207/05* (2013.01)

(58) Field of Classification Search
CPC ........ B60L 7/10; F16H 1/28; F16H 2057/087; H02K 7/006; H02K 7/108; H02K 7/116; H02K 21/24; H02P 3/14; H02P 2207/05
See application file for complete search history.

(56) References Cited

U.S. PATENT DOCUMENTS

| | | | |
|---|---|---|---|
| 2021/0178893 A1* | 6/2021 | Yang | B60K 17/046 |
| 2022/0094249 A1* | 3/2022 | Morisawa | H02K 21/026 |
| 2022/0135179 A1* | 5/2022 | Lee | B62J 45/413 |
| | | | 180/206.6 |

FOREIGN PATENT DOCUMENTS

| | | |
|---|---|---|
| CN | 103640470 A | 3/2014 |
| CN | 105024509 A | 11/2015 |
| CN | 103640470 B | 1/2016 |
| CN | 103935232 B | 3/2016 |
| CN | 105620264 A | 6/2016 |
| CN | 207117333 U | 3/2018 |
| CN | 109572388 A | 4/2019 |
| CN | 109606096 A | 4/2019 |
| CN | 110120729 A | 8/2019 |
| CN | 110417225 A | 11/2019 |
| CN | 111845320 A | 10/2020 |
| WO | 2016113567 A1 | 7/2016 |

* cited by examiner

DUAL-ROTOR IN-WHEEL MOTOR BASED ON AXIAL MAGNETIC FIELD AND CONTROL METHOD THEREOF

CROSS REFERENCE TO THE RELATED APPLICATIONS

This application is the national phase entry of International Application No. PCT/CN2021/081107, filed on Mar. 16, 2021, which is based upon and claims priority to Chinese Patent Application No. 202110123294.7, filed on Jan. 29, 2021, the entire contents of which are incorporated herein by reference.

TECHNICAL FIELD

The present invention relates to an in-wheel motor for electric vehicles and a control method thereof, and in particular, to a dual-rotor in-wheel motor based on an axial magnetic field and a control method thereof, which belong to the field of drive motors for electric vehicles and control technologies thereof.

BACKGROUND

Among existing drive motors for vehicles, an in-wheel motor has advantages such as a simple and compact structure, a high-efficiency and energy-saving transmission system, and independent and controllable driving and braking torques and can easily realize front-wheel drive, rear-wheel drive, and four-wheel drive; therefore, it is an important trend for the development of next-generation electric vehicles. The existing outer-rotor direct drive and inner-rotor reduction drive in-wheel motors have certain defects in practical applications and their applicable occasions are limited. For example, the outer-rotor direct drive in-wheel motor requires a large current to provide a high torque in startup, climbing, or any other conditions, so that the battery is easily damaged and such a motor is mainly used in occasions such as running on a flat road or with a light load. The inner-rotor reduction drive in-wheel motor has a speed reduction device which reduces the efficiency, and such a motor is mainly used in occasions such as running in hilly or mountainous areas or requiring a high overload capacity.

A dual-rotor motor has two mechanical ports and two electrical ports. Electrical energy and mechanical energy can flow freely between the four ports, thereby realizing power split. The dual-rotor motor is applicable in multiple working conditions of electric vehicles.

Chinese Patent No. CN103935232B discloses an electric wheel based on a dual-rotor motor and a control method thereof. This patented technology expands the application range of regenerative braking of the motor and increases the driving range to a certain extent. However, only the outer rotor drives a vehicle and a single driving mode is provided.

Chinese Patent No. CN103640470B discloses a dual-rotor motor structure for vehicle hub drive. This patented technology has four modes, that is, driving, braking, braking energy recovery, and on-board power generation and integrates a planetary gear mechanism to implement switching between the modes. However, since the inner rotor is limited to driving and the outer rotor is limited to braking/braking energy recovery, this motor cannot well adapt to variable running conditions of automobiles.

Chinese Patent No. CN110120729A discloses a stator yoke-free dual-rotor disc-type permanent-magnet synchronous motor based on a radial magnetic field and Chinese Patent No. CN110417225A discloses a dual-rotor disc hub permanent-magnet synchronous motor. The two motors both feature small axial size, high torque output, and the like, but provide a single driving mode, which makes it difficult to maintain high efficiency in variable running conditions.

Chinese Patent No. CN109572388A discloses an integrated counter-rotating dual-rotor electric wheel structure. This patented technology can realize multiple driving modes and expand the running speed and torque range of a hub drive system. However, this structure is complex and employs two sets of planetary gear mechanisms and dual brakes, so that it has a large volume and is not suitable to be mounted in a limited space of a hub.

Chinese Patent No. CN109606096A discloses an integrated electric wheel structure based on a dual-rotor motor and a working method thereof. This patent employs a radial air-gap dual-rotor in-wheel motor structure to realize driving/braking modes by using inner and outer motors separately or jointly, and can thus adapt to variable running conditions of automobiles. However, the designed and manufactured prototype structure has a large axial size and a heavy weight, so it is obvious that this structure still needs to be improved before real vehicle assembly.

SUMMARY

Objective of the invention: To eliminate the defects in the prior art, the present invention provides a dual-rotor in-wheel motor structure based on an axial magnetic field and a control method thereof. The present invention has multiple driving and braking modes and can adapt to variable running conditions of automobiles, so that the energy consumption of the whole vehicle is reduced, and the axial size and the weight of the in-wheel motor can be largely reduced.

Technical solutions: A dual-rotor in-wheel motor based on an axial magnetic field includes an axle and a hub. The axle is fixedly connected to a frame and the hub relatively rotates around the axle. A disc-shaped intermediate stator is fixedly connected on the axle. A left coil assembly and a right coil assembly are fixedly mounted on two sides of the intermediate stator, respectively. A left rotor and a right rotor are respectively arranged on the two sides of the intermediate stator. The left rotor and the right rotor are mounted on the axle and relatively rotate around the axle. The left coil assembly drives the left rotor to rotate, and the right coil assembly drives the right rotor to rotate. A left clutch is arranged between the left rotor and the hub, and a right clutch and a speed reduction mechanism are arranged between the right rotor and the hub.

By introducing two rotors on the left and right sides, one common intermediate stator, two electromagnetic clutches, and one planetary gear mechanism, the present invention can realize multiple modes including driving by the left or right motor alone and driving by both the left and right motors. Therefore, the present invention can adapt to variable working conditions during actual running of a vehicle and the two motors can both work efficiently, so that the energy consumption of the whole vehicle is reduced.

Further, to achieve the axial magnetic field of the motor, left permanent magnets are arranged on the left rotor, the left permanent magnets include N poles and S poles which are alternately distributed and are uniformly and circumferentially arranged about a center of the left rotor on a surface of the left rotor, and the left permanent magnets face the left coil assembly; right permanent magnets are arranged on the right rotor, the right permanent magnets include N poles and S poles which are alternately distributed and are uniformly and circumferentially arranged about a center of the right rotor on a surface of the right rotor, and the right permanent magnets face the right coil assembly. Due to the axial magnetic field of the motor, the axial size of the motor can be effectively reduced.

Further, to reduce the axial size of the motor, the left rotor and the right rotor are thin disc-shaped and respectively have sections in shapes of vertically arranged pans with bottoms of the pans being back-to-back symmetrically arranged on the two sides of the intermediate stator, respectively. Through the structural design of the left rotor and the right rotor, the spaces for mounting the left and right clutches are optimized, so that the axial size and the weight of the motor are further reduced, the requirements of assembling the dual-rotor in-wheel motor in a vehicle are satisfied, and the motor can be easily applied in a real vehicle.

Further, to reduce the speed while increasing the torque, the speed reduction mechanism is a single planetary gear mechanism including a sun gear, a planetary gear, a planet carrier, and a ring gear, the right clutch connects the sun gear to the right rotor, the planet carrier is fixedly connected to the hub, and connecting pins are arranged between the ring gear and the intermediate stator. The single planetary gear mechanism is used to change a transmission ratio.

Further, to achieve stable connection of the intermediate stator to the axle, the axle has a hollow tubular structure, and a connecting key for connection with the intermediate stator is arranged on an outer diameter of the axle. A flat key is disposed in a key slot of the axle to fixedly connect the intermediate stator to the axle.

Further, to supply power to the motor and the clutches, the axle has a hollow tubular structure, and at least two wire passing holes extending through a tube wall are arranged on the outer diameter of the axle. The wire passing holes are used for guiding out coil leads of the left coil assembly and the left clutch and coil leads of the right coil assembly and the right clutch.

According to a control method of the dual-rotor in-wheel motor based on an axial magnetic field, working modes including driving by the right motor alone, driving by the left motor alone, driving by both the left and right motors, regenerative braking by the right motor alone, regenerative braking by the left motor alone, and regenerative braking by both the left and right motors are realized by controlling the left clutch and the right clutch and controlling the left coil assembly and the right coil assembly.

In the mode of driving by the right motor alone: when the left clutch is turned off and the right clutch is turned on, three-phase currents are supplied to the right coil assembly of the intermediate stator to produce a rotating magnetic field, the rotating magnetic field interacts with an axial magnetic field of the right permanent magnets on the right rotor to produce an electromagnetic torque, and the right rotor is driven to rotate by the torque; power is output through the right clutch, the sun gear, and the planet carrier to the hub and drives a vehicle to run. After the planetary gear mechanism acts to reduce the speed while increasing the torque, a large driving torque is output at the wheel, but the wheel speed is somewhat reduced. Therefore, this mode is mainly used when an electric vehicle travels in urban areas at a low speed but high torque.

In the mode of driving by the left motor alone: when the right clutch is turned off and the left clutch is turned on, three-phase currents are supplied to the left coil assembly of the intermediate stator to produce a rotating magnetic field, the rotating magnetic field interacts with an axial magnetic field of the left permanent magnets on the left rotor to produce an electromagnetic torque, and the left rotor is driven to rotate by the torque; power is directly output through the left clutch to the hub and drives a vehicle to run. Since the left motor is a direct drive in-wheel motor and the left rotor has a large moment of inertia, it is suitable for running at a constant speed. Therefore, this mode is mainly used when an electric vehicle travels at a high speed in suburbs.

In the mode of driving by both the left and right motors: when the left clutch and the right clutch are both turned on, three-phase currents are supplied to the left coil assembly and the right coil assembly of the intermediate stator to produce a rotating magnetic field on each side, the rotating magnetic fields interact with an axial magnetic field of the left permanent magnets on the left rotor and with an axial magnetic field of the right permanent magnets on the right rotor to produce an electromagnetic torque on each side, and the left rotor and the right rotor are each driven to rotate by the corresponding torque; the driving torques from the left and right motors are coupled and superposed at the hub to drive a vehicle to run. Since a higher driving torque can be provided at the wheel, this mode is mainly used when an electric vehicle is climbing or accelerating at a low speed.

In the mode of regenerative braking by the right motor alone: when a vehicle brakes to slow down in the mode of driving by the right motor alone, kinetic energy of a rotating wheel is transmitted through the planet carrier, the sun gear, and the right clutch to the right rotor and drives the right rotor to rotate, the axial magnetic field of the right permanent magnets on the right rotor changes periodically, and an induced electromotive force is generated in the right coil assembly of the intermediate stator; if the induced electromotive force is greater than a voltage of a power battery, the power battery is charged, and the motor is generating electricity.

In the mode of regenerative braking by the left motor alone: when a vehicle brakes to slow down in the mode of driving by the left motor alone, kinetic energy of a rotating wheel is transmitted through the left clutch to the left rotor and drives the left rotor to rotate, the axial magnetic field of the left permanent magnets on the left rotor changes periodically, and an induced electromotive force is generated in the left coil assembly of the intermediate stator; if the induced electromotive force is greater than a voltage of a power battery, the power battery is charged, and the motor is generating electricity.

In the mode of regenerative braking by both the left and right motors: when a vehicle brakes to slow down in the mode of driving by both the left and right motors, kinetic energy of a rotating wheel is transmitted through the planet carrier, the sun gear, and the right clutch to the right rotor and drives the right rotor to rotate, and is transmitted through the left clutch to the left rotor and drives the left rotor to rotate; the axial magnetic field of the right permanent magnets on the right rotor and the axial magnetic field of the left permanent magnets on the left rotor change periodically, and an induced electromotive force is generated in the right coil assembly and an induced electromotive force is generated in the left coil assembly of the intermediate stator; if the induced electromotive forces are greater than a voltage of a power battery, the power battery is charged by both motors, and the two motors are generating electricity.

Beneficial effects: Compared with a conventional single-rotor single-stator disc-type motor based on an axial magnetic field, the motor of the present invention has two rotors on the left and right sides, one intermediate stator, two electromagnetic clutches, and one planetary gear mechanism, and can realize multiple modes including driving by the left or right motor alone and driving by both the left and right motors. Therefore, the present invention can adapt to variable working conditions during actual running of a vehicle and the two motors can both work efficiently, so that the energy consumption of the whole vehicle is reduced. Compared with a dual-rotor electric wheel with a radial magnetic field structure, due to the axial magnetic field of the motor, the axial size of the motor can be effectively reduced. The intermediate stator is thin disc-shaped, the left coil assembly and the right coil assembly are designed in protruding structures, and the left and right rotors each have a section in a shape of a vertically arranged pan, where the bottoms of the pans are back-to-back symmetrically arranged on two sides of the intermediate stator, respectively. Therefore, the spaces for mounting the left and right clutches are optimized, so that the axial size and the weight of the motor are further reduced, the requirements of assembling the dual-rotor in-wheel motor in a vehicle are satisfied, and the motor can be easily applied in a real vehicle.

BRIEF DESCRIPTION OF THE DRAWINGS

To illustrate the technical solutions in the embodiments of the present invention or in the prior art more clearly, the accompanying drawings required for the description of the embodiments or the prior art are introduced briefly in the following. Apparently, the accompanying drawings in the following description show merely embodiments of the present invention, and persons of ordinary skill in the art can derive other drawings from the accompanying drawings without creative efforts.

In the drawings: 1. axle; 2. hub; 3. intermediate stator; 4. left coil assembly; 5. right coil assembly; 6. left rotor; 7. right rotor; 8. left clutch; 9. right clutch; 10. speed reduction mechanism; 61. left permanent magnet; 71. right permanent magnet; 11. sun gear; 12. planetary gear; 13. planet carrier; 14. ring gear; 15. connecting pin; 31. connecting key; 32. wire passing hole.

DETAILED DESCRIPTION OF THE EMBODIMENTS

The technical solutions of the present invention will be clearly and completely described below with reference to the accompanying drawings in the embodiments of the present invention. It is obvious that the embodiments to be described are only a part rather than all of the embodiments of the present invention. All other embodiments derived by persons of ordinary skill in the art based on the embodiments of the present invention without creative efforts shall fall within the protection scope of the present invention.

In the description of the present invention, it should be understood that terms such as "upper", "lower", "front", "back", "left", "right", "vertical", "horizontal", "top", "bottom", "inner", and "outer" indicate directional or positional relationships based on the accompanying drawings. They are merely used for the convenience and simplicity of the description of the present invention, instead of indicating or implying that the demonstrated device or element is located in a specific direction or is constructed and operated in a specific direction. Therefore, they cannot be construed as limitations to the present invention.

In the present invention, unless otherwise expressly specified and defined, a first feature "on" or "under" a second feature may denote that the first and second features are in direct contact or the first and second features are not in direct contact but through another feature between them. Moreover, the first feature "on", "over", or "above" the second feature denotes that the first feature is directly above or obliquely above the second feature or it simply means that the first feature is at a higher level than the second feature. The first feature "under", "beneath", or "below" the second feature denotes that the first feature is directly below or obliquely below the second feature or it simply means that the first feature is at a lower level than the second feature.

Figure 1:
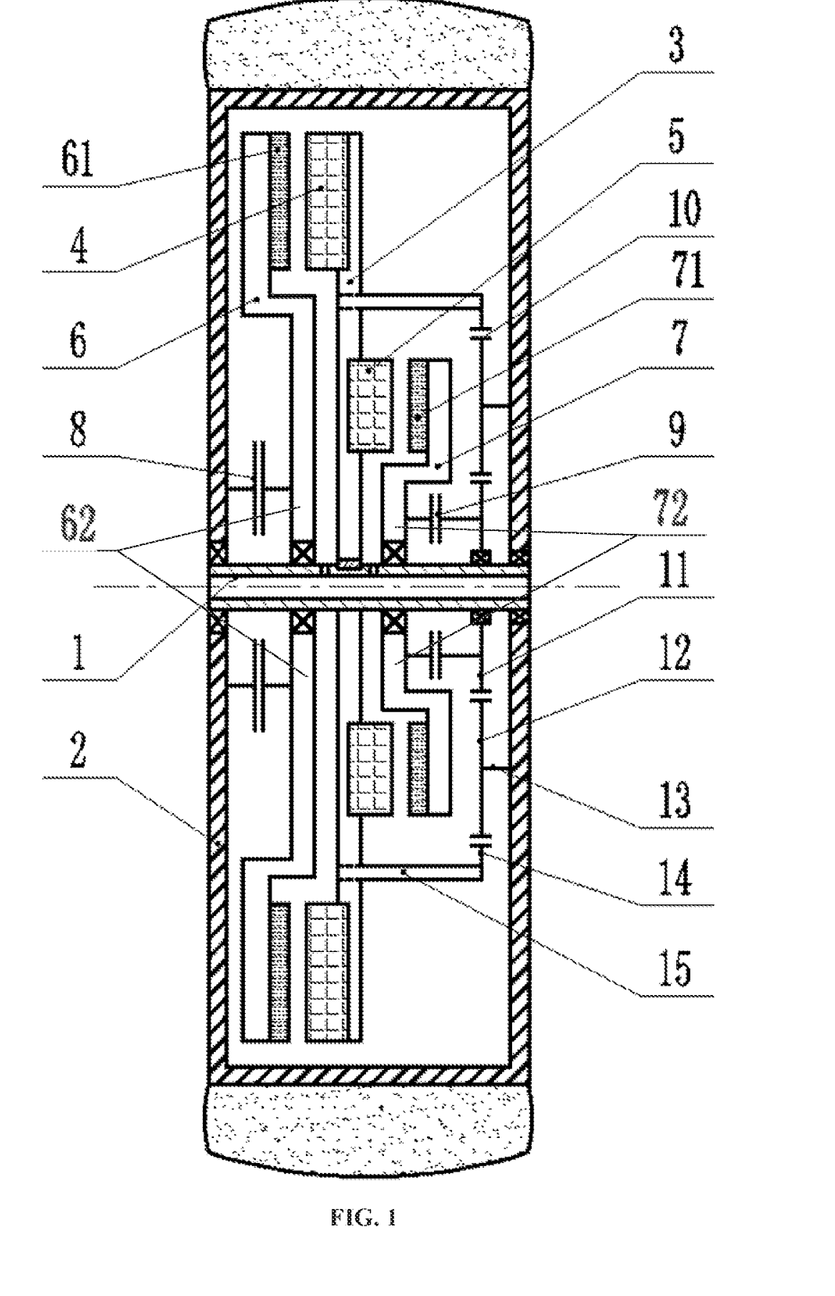
FIG. 1 is a schematic structural diagram of the present invention.

As shown in FIG. 1, a dual-rotor in-wheel motor based on an axial magnetic field consists of a left rotor 6, left permanent magnets 61, a left coil assembly 4, a left clutch 8, an intermediate stator 3, a right rotor 7, right permanent magnets 71, a right coil assembly 5, a right clutch 9, a sun gear 11, a planetary gear 12, a planet carrier 13, a ring gear 14, connecting pins 15, an axle 1, and a hub 2.

Figure 2:
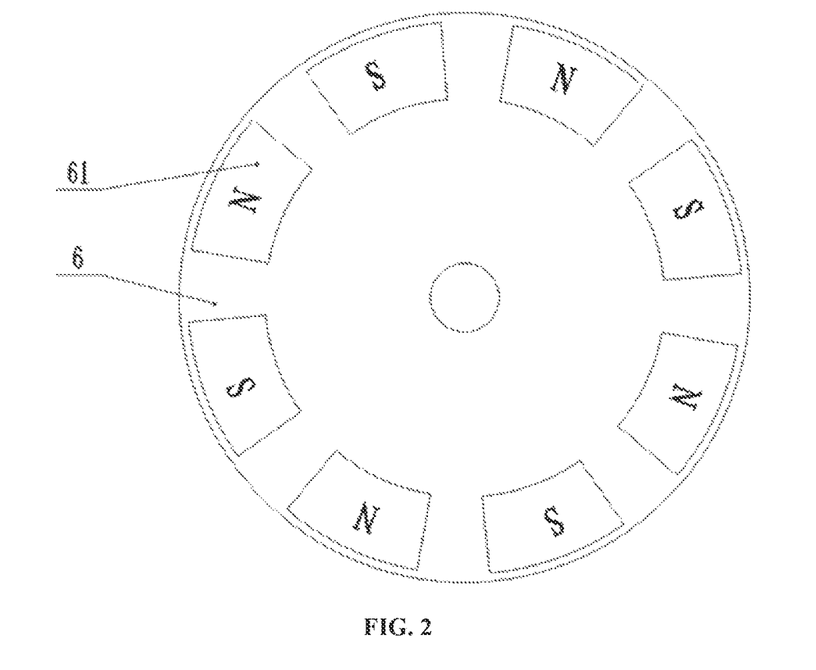
FIG. 2 is a schematic structural diagram of a left rotor and left permanent magnets according to the present invention.
Figure 3:
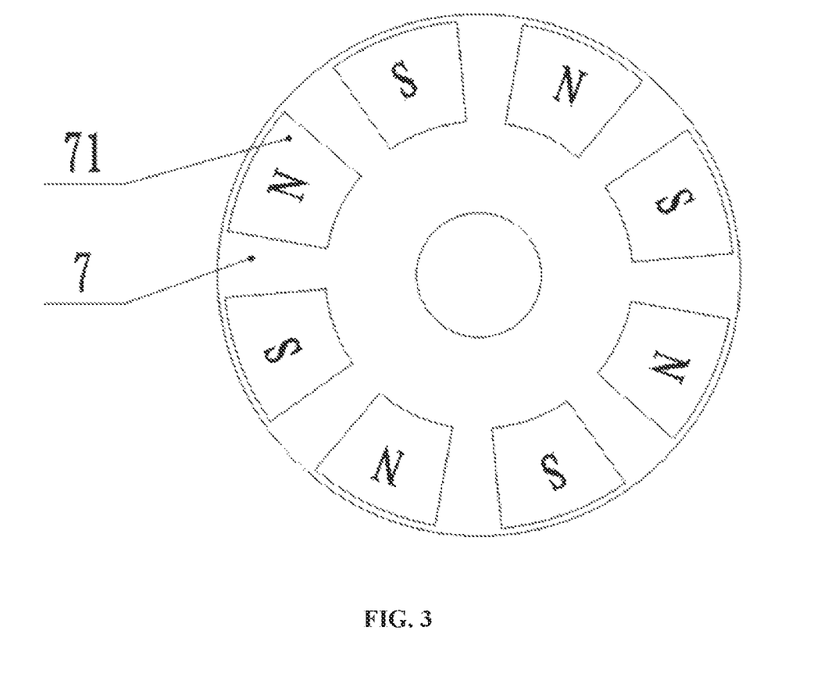
FIG. 3 is a schematic structural diagram of a right rotor and right permanent magnets according to the present invention.

As shown in FIG. 2 and FIG. 3, the left rotor 6 and the right rotor 7 are thin disc-shaped. To further reduce the axial size, the left rotor 6 and the right rotor 7 each have a section in the shape of a vertically arranged pan (see 6 and 7 in FIG. 1), where the bottoms of the pans 62 and 72 are back-to-back symmetrically arranged on two sides of the intermediate stator, respectively (as shown in FIG. 1). The left permanent magnets 61 are uniformly arranged on an outer edge of a right end surface of the left rotor 6, N poles and S poles of the magnets are alternately distributed, and the direction of produced magnetic field lines is consistent with the axis direction of the axle 1. The right permanent magnets 71 are uniformly arranged on an outer edge of a left end surface of the right rotor 7, N poles and S poles of the magnets are alternately distributed, and the direction of produced magnetic field lines is consistent with the axis direction of the axle 1.

Figure 4:
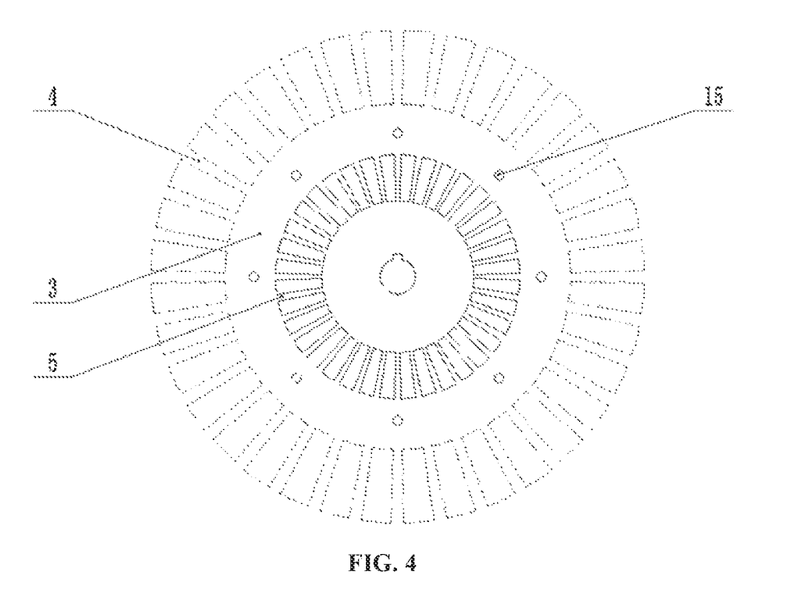
FIG. 4 is a schematic structural diagram of an intermediate stator according to the present invention.

As shown in FIG. 1 or FIG. 4, the intermediate stator 3 is thin disc-shaped, left coil slots (depicted by dashed lines in FIG. 4) and right coil slots (depicted by solid lines in FIG. 4) are designed in protruding structures, the left coil slots are uniformly distributed on an outer edge of a left end surface of the intermediate stator 3, the right coil slots are uniformly distributed on an inner edge of a right end surface of the intermediate stator 3, and left coil windings and right coil windings are embedded in the left coil slots and the right coil slots, respectively. When alternating currents are supplied to three-phase windings constituted by the left coil windings and to three-phase windings constituted by the right coil windings, a rotating magnetic field is generated on each side and the direction of magnetic field lines produced by the rotating magnetic field is also consistent with the axis direction of the axle 1. The rotating magnetic field interacts with the magnetic field generated by the permanent magnets on each side to produce an electromagnetic torque, and thus the left rotor 6 and the right rotor 7 are each driven to rotate by the corresponding torque. A plurality of uniformly distributed threaded holes are provided between the left coil slots and the right coil slots and are used for mounting the connecting pins 15. The intermediate stator 3 is fixedly connected to the axle 1 through a flat key.

Figure 5:
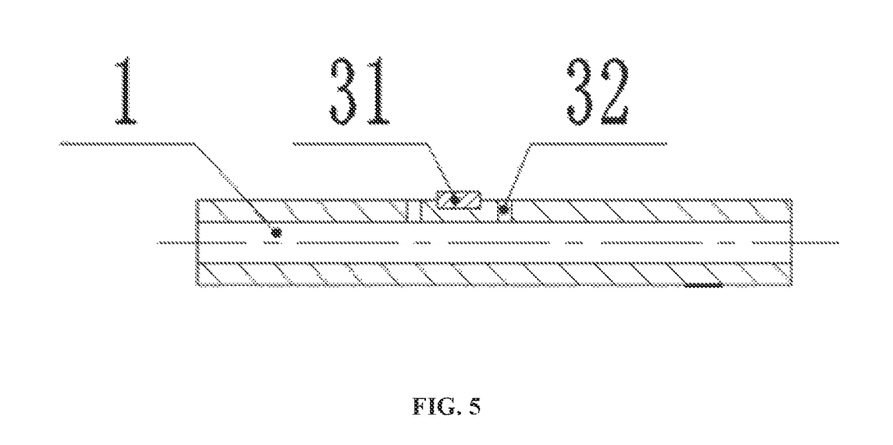
FIG. 5 is a schematic structural diagram of an axle according to the present invention.

As shown in FIG. 5, the axle 1 has a cylindrical structure and is fixedly connected to a frame. A key slot and wire passing holes 32 are provided on the surface of the axle 1. The intermediate stator 3 is fixedly connected to the axle 1 through a flat key 31 in the key slot. The wire passing holes 32 are used for guiding out coil leads of the left coil assembly 4 and the left clutch 8 and coil leads of the right coil assembly 5 and the right electromagnetic clutch 9.

As shown in FIG. 1, the sun gear 11, the planetary gear 12, the planet carrier 13, and the ring gear 14 constitute a single planetary gear mechanism. The sun gear 11 is connected to the right clutch 9 and is mounted on the axle 1 through a bearing, the planet carrier 13 is fixedly connected to the hub 2, and the ring gear 14 is fixedly connected to the connecting pins 15.

As shown in FIG. 1, the left clutch 8 and the right clutch 9 are ring-shaped and can be idly sleeved on the axle 1. The left clutch 8 is used for disconnecting or connecting power transmission between the left rotor 6 and the hub 2. The right clutch 9 is used for disconnecting or connecting power transmission between the right rotor 7 and the sun gear 11. A left permanent-magnet synchronous motor constituted by the left rotor 6, the left permanent magnets 61, and the left coil assembly 4 on the intermediate stator 3 has a transmission ratio of 1 and is a direct drive in-wheel motor. A right permanent-magnet synchronous motor constituted by the right rotor 7, the right permanent magnets 71, and the right coil assembly 5 on the intermediate stator 3 has a transmission ratio greater than 1 and is an in-wheel motor that drives by reducing the speed while increasing the torque. Multiple working modes of the two motors can be realized by controlling the left clutch 8 or the right clutch 9 to carry out different actions.

The dual-rotor in-wheel motor based on an axial magnetic field has working modes including driving by the left motor alone, driving by the right motor alone, driving by both the left and right motors, regenerative braking by the left motor alone, regenerative braking by the right motor alone, and regenerative braking by both the left and right motors, and the details are described below.

1. Driving Modes (1) Driving by the Right Motor Alone

Figure 6:
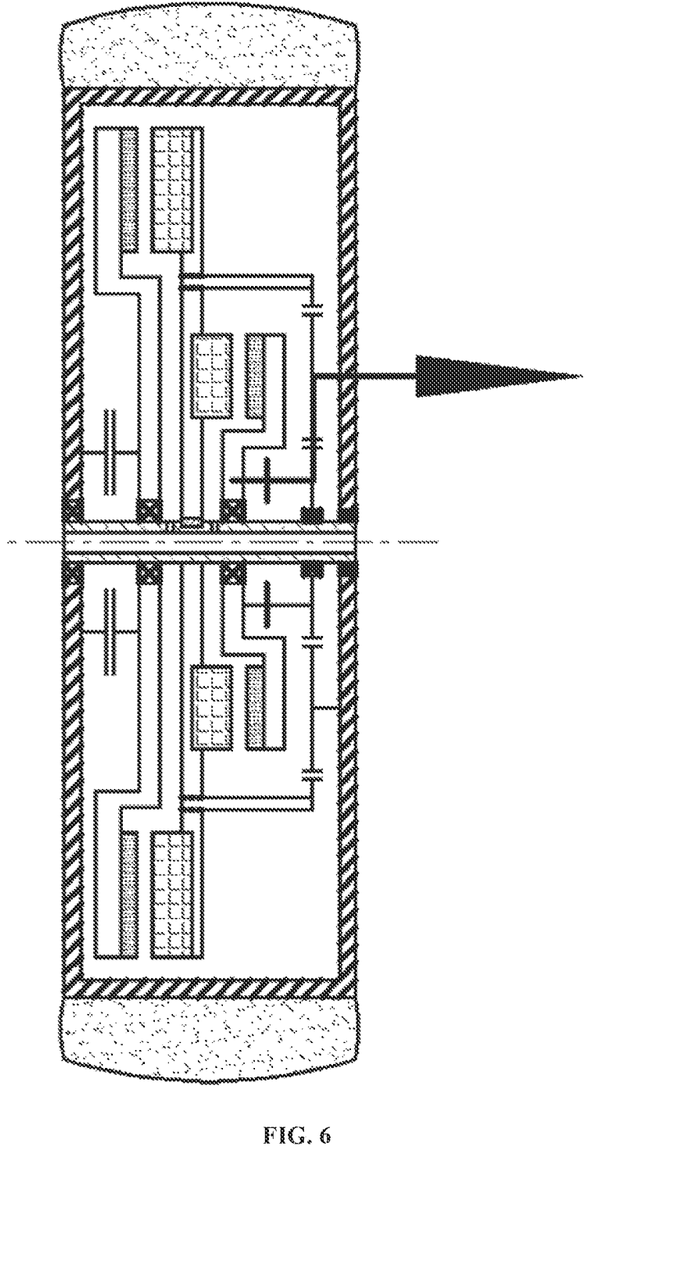
FIG. 6 is a diagram showing a power transmission path in a mode of driving by a right motor alone according to the present invention.

When the left clutch 8 is turned off and the right clutch 9 is turned on, three-phase currents are supplied to the right coil assembly 5 of the intermediate stator 3 to produce a rotating magnetic field, the rotating magnetic field interacts with an axial magnetic field of the right permanent magnets 71 on the right rotor 7 to produce an electromagnetic torque, and the right rotor 7 is driven to rotate by the torque. Power is output through the right clutch 9, the sun gear 11, and the planet carrier 13 to the hub 2 and drives a vehicle to run. The mode of driving by the right motor alone is realized and its power transmission path is shown in FIG. 6. After the planetary gear mechanism acts to reduce the speed while increasing the torque, a large driving torque is output at the wheel, but the wheel speed is somewhat reduced. Therefore, this mode is mainly used when an electric vehicle travels in urban areas at a low speed but high torque.

(2) Driving by the Left Motor Alone

Figure 7:
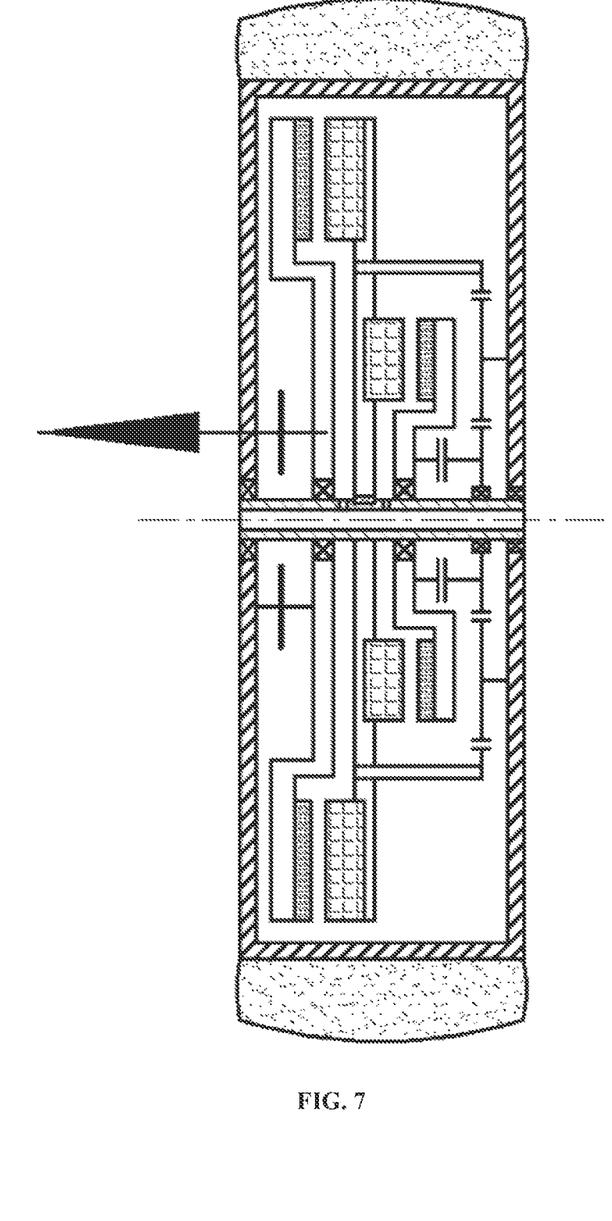
FIG. 7 is a diagram showing a power transmission path in a mode of driving by a left motor alone according to the present invention.

When the right clutch 9 is turned off and the left clutch 8 is turned on, three-phase currents are supplied to the left coil assembly 4 of the intermediate stator 3 to produce a rotating magnetic field, the rotating magnetic field interacts with an axial magnetic field of the left permanent magnets 61 on the left rotor 6 to produce an electromagnetic torque, and the left rotor 6 is driven to rotate by the torque. Power is directly output through the left clutch 8 to the hub 2 and drives a vehicle to run. The mode of driving by the left motor alone is realized and its power transmission path is shown in FIG. 7. Since the left motor is a direct drive in-wheel motor and the left rotor 6 has a large moment of inertia, it is suitable for running at a constant speed. Therefore, this mode is mainly used when an electric vehicle travels at a high speed in suburbs.

(3) Driving by Both the Left and Right Motors

Figure 8:
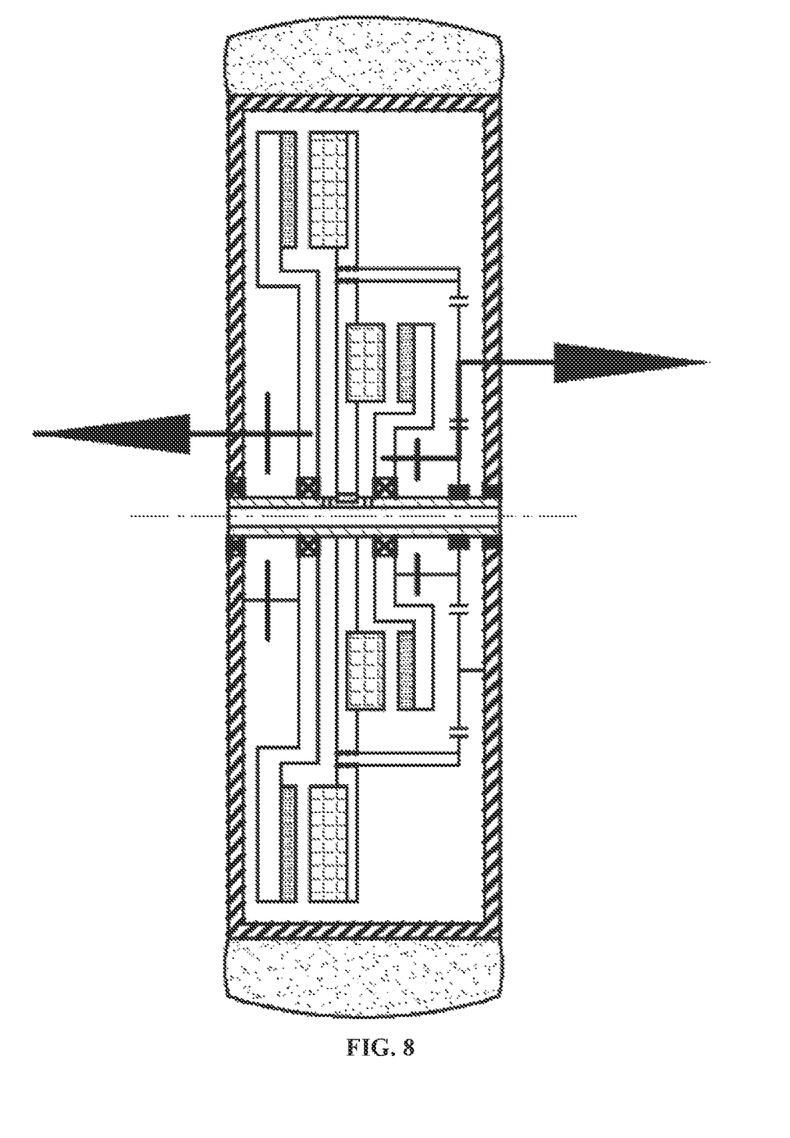
FIG. 8 is a diagram showing power transmission paths in a mode of driving by both the left and right motors according to the present invention.

When the left clutch 8 and the right clutch 9 are both turned on, three-phase currents are supplied to the left coil assembly 4 and the right coil assembly 5 of the intermediate stator 3 to produce a rotating magnetic field on each side, the rotating magnetic fields interact with an axial magnetic field of the left permanent magnets 61 on the left rotor 6 and with an axial magnetic field of the right permanent magnets 71 on the right rotor 7 to produce an electromagnetic torque on each side, and the left rotor 6 and the right rotor 7 are each driven to rotate by the corresponding torque. The driving torques from the left and right motors are coupled and superposed at the hub 2 to drive a vehicle to run. The mode of driving by both the left and right motors is realized. As shown in FIG. 8, the power transmission paths of the left motor and the right motor are the same with the paths when they are used for driving alone. Since a higher driving torque can be provided at the wheel in this mode, it is mainly used when a vehicle is climbing or accelerating at a low speed.

2. Regenerative Braking Modes

When a vehicle brakes to slow down in different driving modes, three corresponding regenerative braking working modes can be realized, that is, regenerative braking by the left motor alone, regenerative braking by the right motor alone, and regenerative braking by both the left and right motors.

(1) Regenerative Braking by the Right Motor Alone

When a vehicle brakes to slow down in the mode of driving by the right motor alone, kinetic energy of the rotating wheel (the hub 2) is transmitted through the planet carrier 13, the sun gear 11, and the right clutch 9 to the right rotor 7 and drives the right rotor 7 to rotate. The axial magnetic field of the right permanent magnets 71 on the right rotor 7 changes periodically, and an induced electromotive force is generated in the right coil assembly 5 of the intermediate stator 3. If the induced electromotive force is greater than the voltage of a power battery, the power battery is charged, and the motor is generating electricity, that is, working in the mode of regenerative braking by the right motor alone. The energy transmission path in this mode is opposite to the power transmission path in the mode of driving by the right motor alone, and the energy transmission path is not depicted.

(2) Regenerative Braking by the Left Motor Alone

When a vehicle brakes to slow down in the mode of driving by the left motor alone, kinetic energy of the rotating wheel (the hub 2) is transmitted through the left clutch 8 to the left rotor 6 and drives the left rotor 6 to rotate. The axial magnetic field of the left permanent magnets 61 on the left rotor 6 changes periodically, and an induced electromotive force is generated in the left coil assembly 4 of the intermediate stator 3. If the induced electromotive force is greater than the voltage of a power battery, the power battery is charged, and the motor is generating electricity, that is, working in the mode of regenerative braking by the left motor alone. The energy transmission path in this mode is opposite to the power transmission path in the mode of driving by the left motor alone, and the energy transmission path is not depicted.

(3) Regenerative Braking by Both the Left and Right Motors

When a vehicle brakes to slow down in the mode of driving by both the left and right motors, kinetic energy of the rotating wheel (the hub 2) is transmitted through the planet carrier 13, the sun gear 11, and the right clutch 9 to the right rotor 7 and drives the right rotor 7 to rotate, and is transmitted through the left clutch 8 to the left rotor 6 and drives the left rotor 6 to rotate. The axial magnetic field of the right permanent magnets 71 on the right rotor 7 and the axial magnetic field of the left permanent magnets 61 on the left rotor 6 change periodically, and an induced electromotive force is generated in the right coil assembly 5 and an induced electromotive force is generated in the left coil assembly 4 of the intermediate stator 3. If the induced electromotive forces are greater than the voltage of a power battery, the power battery is charged by both motors, and the two motors are generating electricity, that is, working in the mode of regenerative braking by both the left and right motors. The energy transmission paths in this mode are opposite to the power transmission paths in the mode of driving by both the left and right motors, and the energy transmission paths are not depicted.

The following advantages are achieved. An electric vehicle can be driven by a corresponding working mode according to actual running conditions, so that the left and right motors can work with optimal efficiency and the energy consumption of the whole vehicle is reduced.

All the embodiments in the specification are described in a progressive manner, each embodiment focuses on the differences from the other embodiments, and reference can be made to each other for the same or similar parts of the embodiments. Since the device disclosed herein corresponds to the method disclosed in the embodiments, the device is described simply and reference can be made to the description about the method for the related parts.

Persons skilled in the art can implement or use the present invention according to the description of the disclosed embodiments. It is apparent to persons skilled in the art that various modifications can be made to these embodiments, and general principles defined in this specification can be implemented in other embodiments without departing from the spirit or scope of the present invention. Therefore, the present invention is not limited by the embodiments described herein, but has the broadest scope conforming to the principles and innovative features disclosed by this specification.

What is claimed is:

1. A dual-rotor in-wheel motor based on an axial magnetic field, comprising an axle and a hub, wherein the axle is fixedly connected to a frame, and the hub relatively rotates around the axle, a disc-shaped intermediate stator is fixedly connected on the axle, a left coil assembly and a right coil assembly are fixedly mounted on two sides of the disc-shaped intermediate stator, respectively, a left rotor and a right rotor are respectively arranged on the two sides of the disc-shaped intermediate stator, the left rotor and the right rotor are mounted on the axle and configured to relatively rotate around the axle, the left coil assembly drives the left rotor to rotate, and the right coil assembly drives the right rotor to rotate; a left clutch is arranged between the left rotor and the hub, and a right clutch and a speed reduction mechanism are arranged between the right rotor and the hub; wherein left permanent magnets are arranged on the left rotor, right permanent magnets are arranged on the right rotor, and the left permanent magnets are located outside the right permanent magnets in a radial direction.

2. The dual-rotor in-wheel motor based on the axial magnetic field according to claim 1, wherein the left permanent magnets comprise N poles and S poles which are alternately distributed and are uniformly and circumferentially arranged about a center of the left rotor on a surface of the left rotor, and the left permanent magnets face the left coil assembly; the right permanent magnets comprise N poles and S poles which are alternately distributed and are uniformly and circumferentially arranged about a center of the right rotor on a surface of the right rotor, and the right permanent magnets face the right coil assembly.

3. The dual-rotor in-wheel motor based on the axial magnetic field according to claim 1, wherein the left rotor and the right rotor are thin disc-shaped and respectively have sections in shapes of vertically arranged pans with bottoms of the pans being back-to-back symmetrically arranged on the two sides of the disc-shaped intermediate stator, respectively.

4. The dual-rotor in-wheel motor based on the axial magnetic field according to claim 1, wherein the speed reduction mechanism is a single planetary gear mechanism comprising a sun gear, a planetary gear, a planet carrier, and a ring gear, the right clutch connects the sun gear to the right rotor, the planet carrier is fixedly connected to the hub, and connecting pins are arranged between the ring gear and the disc-shaped intermediate stator.

5. The dual-rotor in-wheel motor based on the axial magnetic field according to claim 1, wherein the axle has a hollow tubular structure, and a connecting key for connection with the disc-shaped intermediate stator is arranged on an outer diameter of the axle.

6. The dual-rotor in-wheel motor based on the axial magnetic field according to claim 1, wherein the axle has a hollow tubular structure, and at least two wire passing holes extending through a tube wall of the hollow tubular structure are arranged on an outer diameter of the axle.

7. A control method of the dual-rotor in-wheel motor based on the axial magnetic field according to claim 4, wherein working modes comprising driving by a right motor alone, driving by a left motor alone, driving by both the left motor and the right motor, regenerative braking by the right motor alone, regenerative braking by the left motor alone, and regenerative braking by both the left motor and the right motor are realized by controlling the left clutch and the right clutch and controlling the left coil assembly and the right coil assembly;

in the mode of driving by the right motor alone: when the left clutch is turned off and the right clutch is turned on, three-phase currents are supplied to the right coil assembly of the disc-shaped intermediate stator to produce a rotating magnetic field, the rotating magnetic field interacts with an axial magnetic field of the right permanent magnets on the right rotor to produce an electromagnetic torque, and the right rotor is driven to rotate by the torque; power is output through the right clutch, the sun gear, and the planet carrier to the hub and drives a vehicle to run;

in the mode of driving by the left motor alone: when the right clutch is turned off and the left clutch is turned on, three-phase currents are supplied to the left coil assembly of the disc-shaped intermediate stator to produce a rotating magnetic field, the rotating magnetic field interacts with an axial magnetic field of the left permanent magnets on the left rotor to produce an electromagnetic torque, and the left rotor is driven to rotate by the torque; power is directly output through the left clutch to the hub and drives a vehicle to run;

in the mode of driving by both the left motor and the right motor: when the left clutch and the right clutch are both turned on, three-phase currents are supplied to the left coil assembly and the right coil assembly of the disc-shaped intermediate stator to produce a rotating magnetic field on each side, the rotating magnetic fields interact with an axial magnetic field of the left permanent magnets on the left rotor and with an axial magnetic field of the right permanent magnets on the right rotor to produce an electromagnetic torque on each side, and the left rotor and the right rotor are each driven to rotate by the corresponding torque; the driving torques from the left motor and the right motor are coupled and superposed at the hub to drive a vehicle to run;

in the mode of regenerative braking by the right motor alone: when a vehicle brakes to slow down in the mode of driving by the right motor alone, kinetic energy of a rotating wheel is transmitted through the planet carrier, the sun gear, and the right clutch to the right rotor and drives the right rotor to rotate, the axial magnetic field of the right permanent magnets on the right rotor changes periodically, and an induced electromotive force is generated in the right coil assembly of the disc-shaped intermediate stator; when the induced electromotive force is greater than a voltage of a power battery, the power battery is charged, and the motor is generating electricity;

in the mode of regenerative braking by the left motor alone: when a vehicle brakes to slow down in the mode of driving by the left motor alone, kinetic energy of a rotating wheel is transmitted through the left clutch to the left rotor and drives the left rotor to rotate, the axial magnetic field of the left permanent magnets on the left rotor changes periodically, and an induced electromotive force is generated in the left coil assembly of the disc-shaped intermediate stator; when the induced electromotive force is greater than a voltage of a power battery, the power battery is charged, and the motor is generating electricity; and in the mode of regenerative braking by both the left motor and the right motor: when a vehicle brakes to slow down in the mode of driving by both the left motor and the right motor, kinetic energy of a rotating wheel is transmitted through the planet carrier, the sun gear, and the right clutch to the right rotor and drives the right rotor to rotate, and is transmitted through the left clutch to the left rotor and drives the left rotor to rotate; the axial magnetic field of the right permanent magnets on the right rotor and the axial magnetic field of the left permanent magnets on the left rotor change periodically, and an induced electromotive force is generated in the right coil assembly and an induced electromotive force is generated in the left coil assembly of the disc-shaped intermediate stator; when the induced electromotive forces are greater than a voltage of a power battery, the power battery is charged by both motors, and the two motors are generating electricity.

8. The dual-rotor in-wheel motor based on the axial magnetic field according to claim 2, wherein the left rotor and the right rotor are thin disc-shaped and respectively have sections in shapes of vertically arranged pans with bottoms of the pans being back-to-back symmetrically arranged on the two sides of the disc-shaped intermediate stator, respectively.

9. The dual-rotor in-wheel motor based on the axial magnetic field according to claim 5, wherein the axle has the hollow tubular structure, and at least two wire passing holes extending through a tube wall of the hollow tubular structure are arranged on the outer diameter of the axle.

10. The dual-rotor in-wheel motor based on the axial magnetic field according to claim 2, wherein left coil slots are uniformly distributed on an outer edge of a left end surface of the intermediate stator, right coil slots are uniformly distributed on an inner edge of a right end surface of the intermediate stator, left coil windings and right coil windings are embedded in the left coil slots and the right coil slots, respectively; and the left permanent magnets, the right permanent magnets, the left coil windings, and the right coil windings are all staggered in the radial direction.

* * * * *